United States Patent
Alicherry et al.

(10) Patent No.: US 7,660,235 B2
(45) Date of Patent: Feb. 9, 2010

(54) LOW LATENCY SHARED DATA PATH ALLOCATION

(75) Inventors: Mansoor Ali Khan Alicherry, Scotch Plains, NJ (US); Sadanand M Gogate, Monmouth Junction, NJ (US); Harsha S Nagesh, Berkeley Heights, NJ (US); Chitra A Phadke, Basking Ridge, NJ (US); Viswanath Poosala, Middlesex, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1113 days.

(21) Appl. No.: 10/392,574

(22) Filed: Mar. 20, 2003

(65) Prior Publication Data

US 2004/0184402 A1 Sep. 23, 2004

(51) Int. Cl.
H04L 1/16 (2006.01)
(52) U.S. Cl. .................................. 370/217; 370/225
(58) Field of Classification Search ............... 370/237, 370/217, 225
See application file for complete search history.

(56) References Cited

U.S. PATENT DOCUMENTS

| | | | | |
|---|---|---|---|---|
| 5,978,354 | A * | 11/1999 | Taketomi et al. | 370/226 |
| 6,151,304 | A * | 11/2000 | Doshi et al. | 370/238 |
| 6,195,330 | B1 * | 2/2001 | Sawey et al. | 370/220 |
| 6,229,788 | B1 * | 5/2001 | Graves et al. | 370/230 |
| 6,256,291 | B1 * | 7/2001 | Araki | 370/216 |
| 6,694,098 | B1 * | 2/2004 | Warbrick et al. | 398/54 |
| 6,848,062 | B1 * | 1/2005 | Desai et al. | 714/4 |
| 6,992,979 | B2 * | 1/2006 | Hauser et al. | 370/228 |
| 7,020,162 | B2 * | 3/2006 | Iwasaki et al. | 370/468 |
| 7,039,005 | B2 * | 5/2006 | Jenq et al. | 370/217 |
| 7,099,578 | B1 * | 8/2006 | Gerstel | 398/5 |
| 7,161,898 | B1 * | 1/2007 | Mazzurco et al. | 370/217 |
| 7,170,852 | B1 * | 1/2007 | Adler | 370/223 |

(Continued)

OTHER PUBLICATIONS

G. Li, J. Yates, R. Doverspike, and D. Wang, "Experiments in fast restoration using GMPLS in optical/electronic mesh networks," in *Optical Fiber Communication Conference (OFC)*, vol. 54 of 2001 OSA Trends in Optics and Photonics Series (Optical Society of America, Washington, D.C., 2001), paper PD34.

(Continued)

*Primary Examiner*—Andrew Lee
(74) *Attorney, Agent, or Firm*—Ryan, Mason & Lewis, LLP

(57) ABSTRACT

A fast shared path allocation technique is disclosed. Network nodes are pre-configured such that data from multiple data sources or multiple primary data paths may be sent via a shared secondary data path. Merge nodes merge input from a plurality of input ports onto an output port. The merge nodes implement a blocking function such that upon receipt of a signal from one of the input ports, the signals from the other input ports are blocked from reaching the output port. Upon a triggering event indicating a need to allocate the shared path, the data is first sent to the merge node where it is appropriately merged onto the output link and transmitted towards its destination. Only after the data has been sent does the merge node block the remaining input ports from reaching the output port. This blocking may be performed automatically by the merge node or by conventional network signaling.

20 Claims, 3 Drawing Sheets

U.S. PATENT DOCUMENTS

| | | | |
|---|---|---|---|
| 2002/0071392 A1* | 6/2002 | Grover et al. | 370/241 |
| 2002/0181503 A1 | 12/2002 | Montgomery, Jr. | 370/468 |
| 2003/0016623 A1* | 1/2003 | Grover et al. | 370/216 |
| 2003/0028818 A1* | 2/2003 | Fujita | 714/4 |
| 2003/0117950 A1* | 6/2003 | Huang | 370/220 |
| 2003/0147352 A1* | 8/2003 | Ishibashi et al. | 370/248 |
| 2003/0223358 A1* | 12/2003 | Rigby et al. | 370/218 |
| 2003/0229807 A1* | 12/2003 | Qiao et al. | 713/200 |
| 2004/0018812 A1* | 1/2004 | Tanoi | 454/121 |
| 2004/0179472 A1* | 9/2004 | Khalilzadeh et al. | 370/227 |
| 2004/0190444 A1* | 9/2004 | Trudel et al. | 370/224 |
| 2005/0180746 A1* | 8/2005 | Chin et al. | 398/5 |

OTHER PUBLICATIONS

R. Doverspike, G. Sahin, J. Strand, and R. Tkach, "Fast restoration in a mesh network of optical cross-connects," in *Optical Fiber Communication Conference (OFC '99)* (Optical Society of America, Washington, D.C., 1999), paper TuL3.

JungYul Choi et al, "Diverse Restoration Requirements Guaranteed Shared Recovery Scheme in Optical Mesh Networks", *IEEE Tencom 2002, 2002 IEEE Region 10 Conference on Computers, Communications, Control and Power Engineering Proceedings*, Bejing, China, (Oct. 28, 2002), vol. 1 of 3, pp. 1217-1220.

C. Qiao et al, "Choices, Features and Issues in Optical Burst Switching", *Optical Networks Magazine*, SPIE, Bellingham, WA, US, vol. 1, No. 2, (Apr. 2000), pp. 36-44.

Pin-Han Ho et al, "A Framework for Service-Guaranteed Shared Protection in WDM Mesh Networks", IEEE Communications Magazine, IEEE Service Center, Piscataway, NJ, US, vol. 40, No. 2, (Feb. 2002), pp. 97-103.

European Search Report for Application No. 04250907.5-2416- (Jun. 22, 2004), 4 pages.

* cited by examiner

LOW LATENCY SHARED DATA PATH ALLOCATION

TECHNICAL FIELD

This invention relates generally to data networking. More particularly, the invention relates to fast allocation of shared data paths.

BACKGROUND OF THE INVENTION

Data traffic over existing data networks is growing at a tremendous rate. One of the current issues facing network operators is how to efficiently use network resources. One popular type of network is a synchronous optical network (SONET) which is a well known network technology. Generally, SONET networks are organized as ring networks in which the nodes are connected in a closed loop configuration. Adjacent pairs of nodes are directly connected. Other pairs of nodes are indirectly connected with the data passing through one or more intermediate nodes. SONET rings utilized in telecommunication networks have traditionally utilized what is called 1+1 protection schemes. In such a scheme, there are two disjoint optical paths between every two nodes in the network. One path is the primary data path and the other path is the backup path which is only used if the primary path fails. Such a protection scheme allows for fast recovery in case of primary path failure. This fast recovery comes at a high price, however, in that 50% of the network resources go unused most of the time. As such, this is a fairly inefficient use of network resources.

As the result of the development of optical networking technology, other types of transport networks are being developed. In particular, the use of optical add-drop multiplexers (OADMs) and optical cross-connects (OXCs) in the optical transport layer now allow for Wavelength Division Multiplexed (WDM) optical mesh networks, in which network routers are connected directly to a switched optical core transport network consisting of OXC switches interconnected via high-speed Dense WDM (DWDM) line systems. As opposed to a ring network, in a mesh topology, each node may be directly connected to one or more (or all) others nodes. Thus, the topology of such a network resembles a mesh.

One benefit of a mesh network is its ability to share optical paths among multiple bandwidth demands. One such sharing scenario arises in the context of link failure protection schemes. In a mesh network, it is possible for two or more primary paths to share one backup path. Thus, for example, two primary data paths could share one backup path, thus making better use of network resources. In such a scheme, only approximately 33% of the network resources go unused (until a backup path is needed). More than two primary data paths could share one backup path, thus further increasing the efficiency of the network resources. Of course, this higher efficiency comes at the cost of being unable to provide a backup path in the event more than one primary path fails.

Another path sharing scenario arises in the context of bursty traffic. As is well known, internet traffic tends to be bursty with long periods of low traffic followed by sudden surges of high traffic. In such cases, it is preferable to share an optical path among multiple traffic flows. A recently proposed technique in this area is called optical burst switching, and has been proposed as a way to better utilize high capacity optical links amongst multiple IP traffic channels. The basic idea behind optical burst switching is as follows. Multiple demands share a primary path, but only one of the demands can be transmitted at any given time over the shared path. The source nodes for the traffic store the data packets in a memory buffer, and when a sufficient amount of data (i.e., "burst") has accumulated for a demand, the shared path is allocated to, and used by, that demand. Once the burst has been received at the destination, the path becomes available for other demands.

The allocation of shared data paths must occur quickly in today's high speed networks. For example, in the restoration scenario, a failed link must be restored within 50 ms. This limit is generally imposed by telephony services, which require a restore time of 50 ms or less so that any delay would be imperceptible to users. In the optical burst switching scenario, any delay in the allocation of the shared link would result in an underutilization of the shared link and the possible dropping of data packets.

Where the events triggering the allocation of a shared data path are predictable, it is possible to implement an efficient sharing scheme using scheduling and time-division-multiplexing. However, in practice, most shared data path scenarios are not predictable. For example, in the context of optical burst switching, it is not possible to predict when traffic flow will hit a peak for any given data source. Similarly, in the context of failure restoration, it is not possible to determine when a network link will fail. This unpredictability, combined with the requirement of fast link allocation, makes it difficult to implement shared data paths in mesh networks. As will be described in further detail below in the detailed description, upon detection of a triggering event indicating the need for allocation of a shared data path, existing mesh networks need to be reconfigured in order to allocate the shared data path as necessary. This reconfiguration generally requires setting up the shared path by sending appropriate signaling commands to the mesh network components, thus instructing the components to reconfigure themselves as required. This reconfiguration via signaling has heretofore been unable to comply with the 50 ms timing constraint described above. As such, optical mesh networks have not replaced the more convention SONET rings. The 1+1 protection scheme of SONET networks allow such networks to provide the required fast restoration.

What is needed is a technique for allocating shared data paths in mesh networks so that the benefits of mesh networks may be realized in high speed data networks.

SUMMARY OF THE INVENTION

The present invention provides a fast allocation technique for shared data paths. In accordance with the invention, the network is initially configured such that data from any one of a plurality of primary data paths or sources may utilize a shared path without the need for signaling the network to set up the shared path. The shared path is pre-configured to accept data from any of the primary data paths or sources. It is only after the shared path is initially used by one of the primary data paths or sources that the shared path is configured to block input from the other primary data paths or sources. As such, there is no signaling or setup delay prior to the use of the shared path.

In accordance with a restoration embodiment of the invention, a plurality of primary data paths share a secondary data path. As used herein, reference to primary data paths sharing a secondary data path means that data is normally sent via the primary data paths in order to satisfy some associated bandwidth demands. However, upon failure of one of the primary data paths, the associated bandwidth demand may be satisfied by utilizing the secondary data path. In accordance with this embodiment of the invention, upon detecting a need for use of the shared secondary path (e.g., due to a failure in one of the primary paths) data which would have been sent via the failed primary data path is immediately sent via the shared secondary path. There is no need for any signaling or other network setup prior to sending the data via the shared secondary path because the network is already pre-configured such that data from any of the primary paths may be sent via the shared secondary path. Thus, failure restoration may be performed very quickly, with the only delay being the time necessary to detect the failure and the time required to send the data. In order to avoid possible interfering signals from any other primary data path which may fail subsequent to the first failure, any further signals from the other primary paths are blocked from entering the secondary shared data path. However, in accordance with the invention, these other primary paths are blocked subsequent to the transmission of data associated with the first failed path.

In an advantageous embodiment, the blocking of data from the other primary data paths is performed automatically by network nodes which merge the data from the plurality of primary network paths onto the shared secondary path. Alternatively, if such automatic blocking functionality is not available in the network nodes, signaling may be used to configure the network nodes to block the data from the other primary data paths. It is noted that even if signaling is used, failure restoration is performed quickly because this signaling is only performed after the data is sent via the shared backup path.

In another embodiment, the principles of the present invention may be applied in a network which implements optical burst switching. In accordance with this embodiment, a plurality of data sources share a data path which is used for data transmission. As described above, in a network which implements optical burst switching, the data sources only require a data path intermittently. As such, it is efficient to share a primary data path. In accordance with this embodiment of the invention, upon detecting a need for use of the shared path by one of the data sources (e.g., the outgoing data buffer of the data source is full) data is immediately sent via the shared path. There is no need for any signaling or other network setup prior to sending the data via the shared path because the network is already pre-configured such that data from any of the primary paths may be sent via the shared secondary path. Thus, data may be sent very quickly upon recognition of a need for the shared path. In order to avoid possible interfering signals from any other data source which also has a subsequent need for the shared data path, any further signals from the other data sources are blocked from entering the shared data path. Such blocking is as described above in accordance with the restoration embodiment. Upon completion of transmission of data from the data source currently using the shared path, the blocking is removed, either automatically or by signaling.

These and other advantages of the invention will be apparent to those of ordinary skill in the art by reference to the following detailed description and the accompanying drawings.

DETAILED DESCRIPTION

As described above in the background section, a current deficiency in mesh networks is the time required to set up a shared data path. One of the current common signaling protocols used to set up paths in a WDM mesh network is referred to as the AckBased protocol. The AckBased protocol is as follows. Let $N_0$ and $N_n$ be the source and destination nodes and $N_1 \ldots N_{n-1}$ be the nodes along the path between $N_0$ and $N_n$. Let $l_i$ be the wavelength link between $N_{i-1}$ and $N_i$ that is part of this path. The protocol for setting up the path includes the following steps.

1. Source node $N_0$ sends an in-band (i.e., over the path being setup) signal and path information to $N_1$.
2. Node $N_1$ sets up its internal cross connect connecting incoming link $l_1$ to outgoing link $l_2$ and forwards the request to the next node $N_2$.
3. Step 2 is performed in sequence at each node $N_i$:i:1 . . . (n−2).
4. The last node in the path $N_{n-1}$ sets up its internal cross connect and sends a positive acknowledgment (ACK) back to $N_{n-2}$.
5. Once a node $N_i$:i=(n−1). . . 1 receives the positive ACK from node $N_{i+1}$, it sends an ACK to node $N_{i-1}$.
6. Upon receipt of an ACK, source node $N_0$ starts transmitting data on link $l_1$. The time required for the destination node to begin receiving data when the above described AckBased protocol is used is as follows. Let $t_l$ be the average link latency, $t_S$ be the header processing time, $t_a$ be the ACK processing time, and $t_C$ be the time it takes to set up a cross connect. Let $b_s$ be the size of the packet header in bytes and bw be the bandwidth of the links in bytes per second. The time taken for the destination node to begin receiving data consists of three components: 1) the time to set up the path; 2) the time to receive the ACKs; and 3) the time to send the data to the destination. This time ($t_{AB}$) is given by the following equation:

$$t_{AB}=((n-1)\times(t_l+t_S+t_c))+((n-1)\times(t_z+t_l)+t_a)+(n\times t_l) \quad (1)$$

We will now use the above analysis of AckBased protocol timing to discuss the time required to set up a path in the context of shared restoration.

Figure 1:
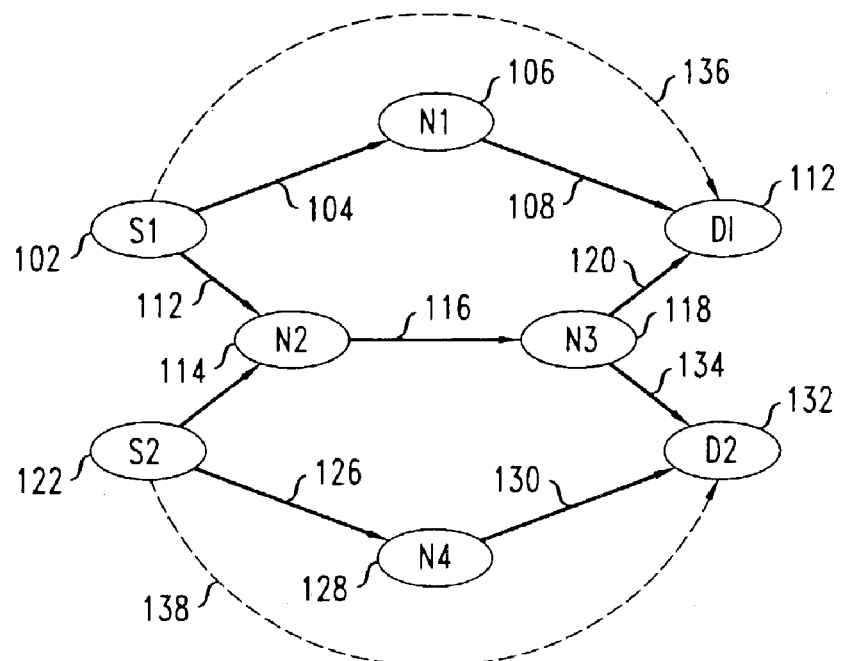
FIG. 1 shows a data network with two bandwidth demands sharing a backup path.

First, with respect to shared restoration, consider the network shown in FIG. 1 which has two demands sharing one backup path. The first demand 136 is from source node S1 102 to destination node D1 112. This demand is provisioned via a primary path from S1 102 to link 104 to node N1 106 to link 108 to destination node D1 112. The second demand 138 is from source node S2 122 to destination node D2 132. This demand is provisioned via a primary path from S2 122 to link 126 to node N4 128 to link 130 to destination node D2 132. The secondary shared path from N2 114 to link 116 to N3 118 is shared between the two demands. Upon a failure in a link or node in the first demand (e.g., link 104) the network would be reconfigured such that node N2 114 would configure its internal cross connect to connect input link 112 to output link 116, and node N3 118 would configure its internal cross connect to connect input link 116 to output link 120. This would allow the first demand to utilize the shared backup path. Similarly, upon a failure in a link or node in the second demand (e.g., link 126) the network would be reconfigured such that node N2 114 would configure its internal cross connect to connect input link 124 to output link 116, and node N3 118 would configure its internal cross connect to connect input link 116 to output link 134. This would allow the second demand to utilize the shared backup path.

The general steps involved in shared restoration are as follows:

1. The source and destination nodes detect the failure;
2. The AckBased protocol (or other path setup protocol) is used to set up the backup path (which has been pre-computed but not pre-setup); and
3. Destination node detects data on the backup path and begins using it.

Thus, the time for the entire restoration process includes the time to detect a fault ($t_{fd}$), the time to set up the backup path, and the time to send the data. It is noted that the latter two components are included in the time ($t_{AB}$) necessary for the AckBased protocol given in equation (1). Thus, the time required for the entire restoration process ($t_{sr}$) is:

$$t_{sr} = t_{fd} + (n \times (t_l + t_s + t_c)) + (n \times (t_z + t_l)) + t_a) + ((n+1) \times t_l) \quad (2)$$

where n is the total number of nodes in the backup path.

Exemplary values for the variables in this equation (2) are as follows. Consider a typical network consisting of 10 links (n=10), each of 300 km length, which results in a link latency time of $t_S$=1 ms (assuming speed of light=3*10$^8$ m/s), a cross connect setup time ($t_c$) of 5 ms and an ack processing time of 0.05 ms. If failure detection time is 10 ms, then the restoration time $t_{sr}$ is 88 ms. This restoration time is clearly greater than the 50 ms restoration time constraint described above.

One skilled in the art would readily be able to apply the above timing analysis to an AckBased protocol implementation of the optical burst switching scenario. However, a faster protocol, called Just Enough Time (JET) has been proposed for optical burst switching in C. Qiao and M. Yoo, *Optical Burst Switching—A New Paradigm for Optical Internet*, Journal of High Speed Networks On WDM Networks, 8(1), 1999. In this protocol, instead of waiting for ACKS to arrive, the data is sent shortly after the header has been sent. The delay time between the header and data ($t_{off}$) is determined such that the data can arrive at a node only after the appropriate cross connect has been set up at that node. The steps involved in this protocol are as follows. Let $N_0$ be the node with the burst ready to transmit to node $N_{n-1}$, where n is the total number of nodes in the path. The steps in this protocol are as follows:

1. Source node $N_0$ sends a header and path information to $N_1$. After waiting $t_{off}$ it also sends the data to $N_1$;
2. $N_1$ sets up its cross connect connecting incoming link $l_1$ to outgoing link $l_2$ and forwards the request to the next node $N_2$;
3. Step 2 is performed in sequence at each $N_i$:i:1 ... (n-2)
4. The last node $N_{n-1}$ sets up its cross connect and sends a positive ACK back to $N_{n-2}$;
5. Once a node $N_i$:i=(n-1) ... 1 receives the positive ACK from node $N_{i+1}$, it sends an ACK to node $N_{i-1}$.

Thus, the time for the destination node to receive data using the JET protocol includes the time to set up the path and the time to send the data. Since most of the data transmission occurs in parallel with the path set up, the required time is smaller than $t_{AB}$ and is given by:

$$t_{JET} = (n \times (t_l + t_s + t_c)) + t_l \quad (3)$$

It is noted that if this time is higher than the time it takes to fill a buffer given a buffer size and packet date rate, then the buffers can overflow with incoming packets, resulting in packet loss. Further, if the time is high performance can suffer because of collisions between the demands on some links, which will cause only one of the bursts to go through and the remaining bursts to be dropped.

Exemplary values for the variables in this equation (3) are as follows. Using the typical network described above in connection with equation (2), which consisted of 10 links (n=10), with a link latency time of $t_S$=1 ms, a cross connect setup time ($t_c$) of 5 ms and an ack processing time of 0.05 ms, the resulting $t_{JET}$ is 61.5 ms.

As can be seen from the above description, the existing techniques for allocating shared paths for data transfer suffer from large set up delays. Our invention solves this problem by providing a novel technique for allocating shared paths.

Figure 2:
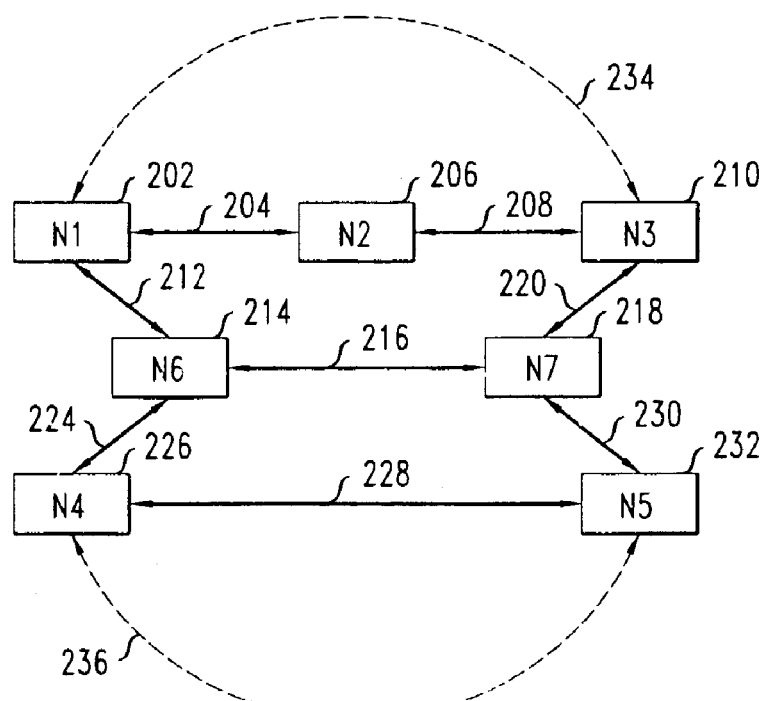
FIG. 2 shows a data network of the type in which the present invention may be implemented with two bandwidth demands sharing a backup path.

FIG. 2 show a network of the type in which the present invention may be implemented. FIG. 2 is an optical mesh network consisting of optical cross connect nodes (N1 202, N2 206, N3 210, N4 226, N5 232, N6 214, N7 218) connected by DWDM line systems (204, 208, 212, 216, 220, 224, 228, 230). Hereinafter these optical line systems will be referred to as links. There are two bandwidth demands. The first demand is represented by line 234 between nodes N1 202 and N3 210. The second demand is represented by line 236 between nodes N4 226 and N5 232. The first demand 234 is satisfied via a primary path from node N1 202 to link 204 to node N2 206 to link 208 to node N3 210. The second demand 236 is satisfied via a primary path from node N4 226 to link 228 to node N5 232. Both demands share a secondary backup path which may be used for restoration in the case of a failure of a node or link on the primary path. The secondary backup path for demand 234 is node N1 202 to link 212 to node N6 214 to link 216 to node N7 218 to link 220 to node N3 210. The secondary backup path for demand 236 is node N4 226 to link 224 to node N6 214 to link 216 to node N7 218 to link 230 to node N5 232.

The prior art techniques for shared restoration, as described above, would wait until a failure was detected in one of the primary paths prior to setting up a secondary backup path. Thus, for example, upon detection of a failure of link 204, node N1 202 would initiate the signaling to set up node N6 to configure an internal cross-connect to connect input link 212 to output link 216. Similar signaling would be sent to node N7 to configure an internal cross-connect to connect input link 216 to output link 220. However, as described above, a problem with this technique is the time required to set up the backup path.

In accordance with the principles of the present invention, the time required to set up a backup path is significantly reduced. In accordance with the principles of the invention, prior to any failure, the secondary backup paths are set up using certain features of the network nodes such that upon failure, the end nodes of a failed demand immediately start sending data on the backup path, without the need for any prior signaling. As such, the time required for a demand to start using its secondary backup path is significantly reduced.

Figure 3:
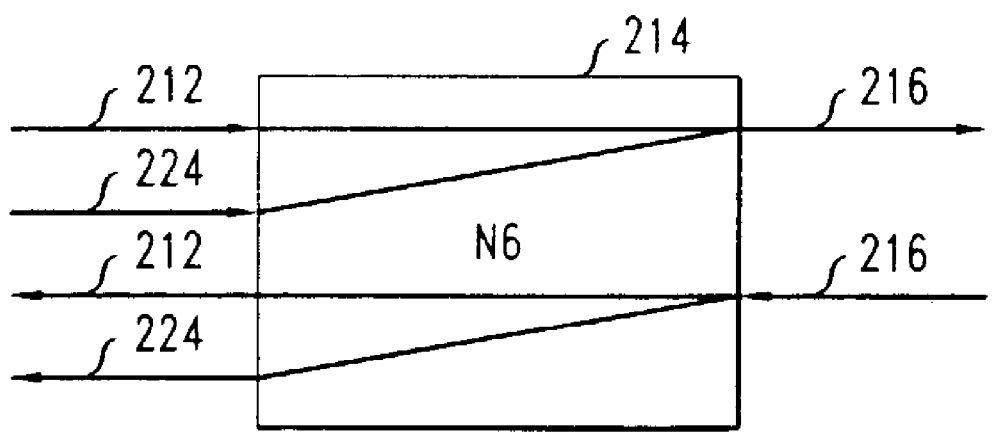
FIG. 3 shows a functional diagram of a network node which implements merge, blocking and multicast functionality.
Figure 4:
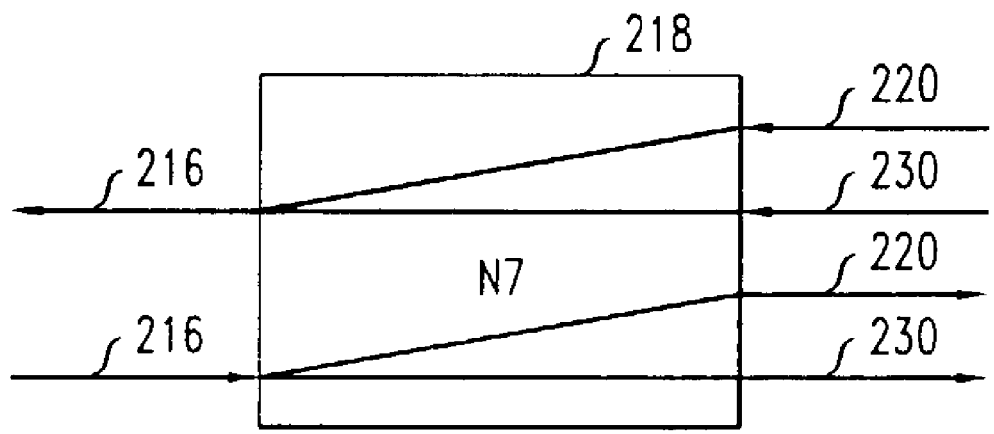
FIG. 4 shows a functional diagram of a network node which implements merge, blocking and multicast functionality.

FIGS. 3 and 4 will be used to described the features of the network nodes which, in one embodiment of the invention, enable the fast restoration. FIG. 3 shows the functionality of node N6 214. Links 212, 224 and 216 are bi-directional links and as shown in FIG. 2, each single link can transmit data bi-directionally. For ease of description, each link is duplicated in FIG. 3 for each direction of data transmission in order to more clearly describe its functionality. First, node N6 214 has so-called merge functionality. That is, the node can merge multiple input links onto a single output link. As shown in FIG. 2, node N6 214 can merge input from links 212 and 224 onto output link 216. Related to the merge function the node also has a so-called blocking function. The blocking function allows light from only one input port to reach the output port while blocking the other input port. Thus, while input ports 212 and 224 are both capable of being merged onto output port 216, when light is received on one of the input ports, light thereafter received on the other output port is blocked. It is noted that for ease of description, the nodes are shown having two input ports and one output port. However, it is possible for the nodes to have more than two input ports, in which case, upon receipt of light on one of the input ports, all other input ports will be blocked. As used herein, if a node implements the above described merge function, it will be referred to as a merge node.

This blocking function may be accomplished in several ways in various embodiments. In an advantageous embodiment, the blocking function is performed by the node automatically upon detection of input on one of its ports (e.g., by providing appropriate control software in a cross-connect switch to react as needed upon detecting light on a port). The length of time between a node receiving input on one of its input ports until it blocks the other input ports is called the blocking time.

Node N6 216 also has a multicasting functionality. That is, the node can multicast input from a single input port to multiple output ports. For example, input from line 216 may be multicast to output links 212 and 224. Multicasting is a technique which is well known to those skilled in the art. An example technique for multicasting is described in Laxman H. Sahasrabuddhe and Biswanath Mukherjee, *Light-Trees: Optical Multicasting for Improved Performance in Wavelength-Routed Networks*, IEEE Communications Magazine, February 1999.

As would be understood from the above description, as shown in FIG. 4, node N7 218 also has the merge, block and multicast functionality as described above.

Restoration in accordance with the present invention occurs as follows. Assume a network as shown in FIG. 2 with nodes N6 214 and N7 218 having the merge, block and multicast functionality as described above and being configured as shown in FIGS. 3 and 4 respectively. At the outset, demands 234 and 236 are being serviced by their primary paths (as described above) and the secondary backup path is not being used. In the direction from node N6 214 to node N7 218, input links 212 and 224 to node N6,214 are merged onto output link 216 as shown in FIG. 3 and are not blocked. Input link 216 to node N7 218 is multicast to output links 220 and 230 as shown in FIG. 4. In the opposite direction from node N7 218 to node N6 214, input links 220 and 230 to node N7 218 are merged onto output link 216 as shown in FIG. 4 and are not blocked. Input link 216 to node N6 214 is multicast to output links 212 and 224 as shown in FIG. 3.

Now assume a failure in link 204. End node N1 202 will detect the failure (note that failure detection is well known in the art of data networking and will not be described herein) and, in accordance with the principles of the invention, will immediately send data over the secondary backup link without the need for any signaling. As such, immediately upon detection of a failure, node N1 202 will transmit data associated with demand 234 via output link 212. Upon receipt of a signal via link 212, node N6 214 will immediately merge the data onto output link 216. Within node N6's 214 blocking time, any subsequent signal from input link 224 will be blocked to avoid interference in the even that a link currently servicing demand 236 also fails. Node N7 218 will receive the signal on link 216 and will multicast the signal on output links 220 and 230. Node N3 210 will receive the signal on link 220. It is noted that node N5 will also receive the signal on link 230 but node N5 will ignore the signal since the data was not intended for node N5.

Thus, the restoration in accordance with the present invention provides a fast allocation of a shared secondary data path, without the delay of setting up the path upon failure detection. There is no signaling or cross-connect set up delays prior to data transmission. The restoration time is merely the time required for the data to traverse the network and reach the destination node. Thus, the restoration time required in accordance with the present invention ($t_{DF}$) is:

$$t_{DF}=(n+1)\times t_l \qquad (4)$$

Using the exemplary value for $t_l$ used above in evaluating the prior art techniques, we result in a $t_{DF}$ of 11.05 ms, assuming a blocking time of 1 ms. Thus, comparing this value to the shared path allocation times of the prior art techniques described above, it is seen that the present invention provides a substantially improved technique for allocating shared paths in a data network.

It is noted that if there are near simultaneous failures in the network, then multiple input signals may arrive on a merge link before blocking is completed. For example, consider a near simultaneous failure of links 204 and 228. In such a case, nodes N1 202 and N4 226 would near simultaneously send data on links 212 and 224. Assuming that data arrives first on link 212, then input link 224 will be blocked within the blocking time. However, during the blocking time interval, the signal from both input link 212 and input link 224 will be merged onto output link 216, causing interference and corrupted data. This problem may be solved in an alternate embodiment by using a special message format, as shown in FIG. 5.

Figure 5:
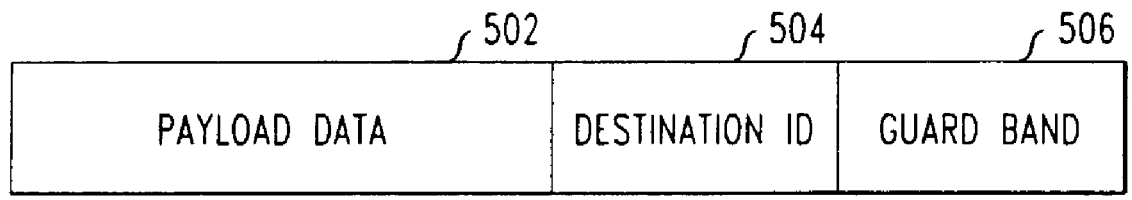
FIG. 5 shows a data packet message format in accordance with one embodiment of the invention.

FIG. 5 shows a message format which includes the payload data 502, an identification of the destination node 504, and a guard band 506. The guard band is added to the beginning of the first data packet sent by a source node upon detection of failure. The guard band is chosen to be a length corresponding to the blocking time of the network nodes. For example, suppose the blocking time of the nodes is 1 ms, and that 1000 bits of data can be processed in 1 ms. In such a case, the guard band will be chosen to contain 1000 bits. Thus, if there is a near simultaneous failure and two input signals reach the input of a merge node at the same time, only the guard band bits will be corrupted because the second to arrive signal will be blocked prior to the destination ID 504 data being processed. Upon receipt by an end node, the end node will ignore the guard band 506 and interrogate the destination ID 504 to determine if the receiving node was the packet's intended destination. If the processing node is the intended destination, then the node processes the payload data 502, otherwise the node discards the data packet.

As described above, in an advantageous embodiment of the invention the network nodes can automatically implement the blocking function. That is, upon receipt of an input signal on one of its input ports, the node can automatically block input from its other input ports. However, such an automatic blocking function is not essential to practice the invention. In the absence of an automatic blocking function, the required blocking can be accomplished using standard network signaling protocols. The difference in this embodiment would be that the blocking time would be longer. For example, suppose that the nodes in FIG. 2 could not automatically implement the blocking function. Restoration in accordance with such an embodiment of the invention would occur as follows. Again, assume that at the outset, demands 234 and 236 are being serviced by their primary paths (as described above) and the secondary backup path is not being used. Upon a failure in link 204, end node N1 202 will detect the failure and will immediately send data over the secondary backup link 212. Node N1 will also transmit a network configuration signal to node N6 214 instructing node N6 214 to block input on link 224. Upon receipt of the data via link 212, node N6 214 will immediately merge the data onto output link 216. Node N6 214 will shortly thereafter receive the network configuration signal instructing it to block the input from link 224. Node N6 214 will then re-configure itself to implement such blocking. It is noted here that while the blocking time of node N6 214 in this embodiment may be longer than the blocking time in the automatic blocking embodiment, this delayed blocking time does not delay the transmission of the data along the secondary backup path. If the guard band is implement, the guard band will be larger to compensate for the longer blocking time.

If there are additional nodes implementing the merge/block function in the secondary backup path, the source node (here node N1 202) will also send a network configuration signal to those nodes to initiate the blocking function.

In another alternate embodiment, the source node detecting the failure may also send network configuration signals to nodes (e.g., node N7 218) implementing the multicast function to terminate the multicast output on the unnecessary output links. For example, in the example being described in conjunction with FIG. 2, such a signal could be sent to node N7 218 instructing that node to terminate its multicasting to output link 230.

Given the above description, one skilled in the art would readily recognize that the principles of the present invention may be advantageously used any time paths are shared in a network. For example, the invention may be implemented in the context of optical burst switching, where two or more data sources share a common data path. In such a case, the triggering event for utilization of the shared resources is not a failure as in the restoration embodiment, but the recognition by one of the data sources that it requires bandwidth for the transmission of data. As described above, this may occur in an optical burst switching embodiment when an output buffer of one of the data sources become full. Upon completion of transmission of data from the data source currently using the shared path, the blocking is removed, either automatically or by signaling.

Figure 6:
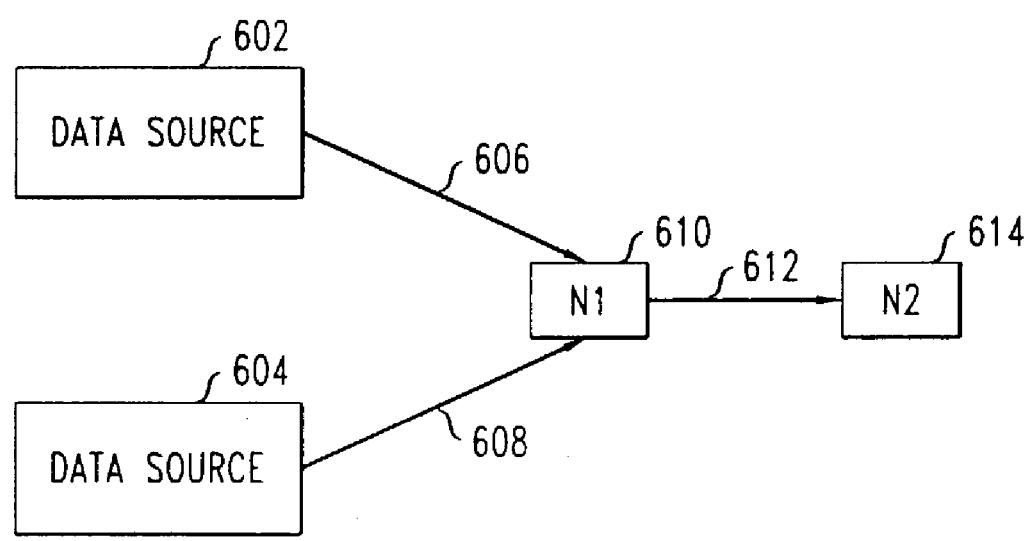
FIG. 6 shows a data network implementing optical burst switching in accordance with the principles of the present invention.

An optical burst switching embodiment is shown in FIG. 6. Data source 602 and data source 604 are both data sources which transmit data in bursts. That is, each data source collects data to be transmitted in an internal buffer, and only transmits the data via the network when the buffer is full. As such, the intermittent transmission characteristics of these data sources allow them to share a single data path. In FIG. 6, data source 602 and data source 604 share the path from node N1 610 to destination node N2 614. Node N1 610 is configured as a merge link as described above such that it is pre-configured to merge input links 606 and 608 onto output link 612. Node NI 610 is also configured such that, upon receipt of a signal on link 606 or 608 it will block a signal from the other input link from reaching output link 612. As would be recognized by one skilled in the art, the basic functioning of the network shown in FIG. 6 and node N1 610 is as described above in connection with the restoration embodiment. The main difference between these embodiments is the triggering event which causes the data source to transmit data via the shared network path. In this embodiment, the blocking function of node N1 610 will be removed upon completion of the transmission burst of a data source. Again, this removal of the blocking function may be automatic or as a result of a configuration signal sent to the node.

It is noted that the various embodiments described above, including the various methods of implementing blocking, do not have an adverse effect on the primary goal of fast shared path allocation. That is, in all of the embodiments described, the data is sent immediately upon detecting a need for use of the secondary path. The blocking time may be different, but the data which needs to get to the destination is send immediately. The blocking comes after the initial sending of the data. Since in most circumstances, near simultaneous failures will not occur, the risk of data corruption during the blocking time interval is acceptable in view of the benefit of near immediate allocation of the shared path.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for operating a data network comprising a plurality of primary data paths sharing a secondary data path, said method comprising the steps of:

upon detecting a need for use of said secondary path, sending data from one of said primary paths via said secondary path; and blocking data from the other primary paths from entering said secondary path after said sending data from said one primary path via said secondary path;

wherein said blocking is responsive to any sending of data from said one primary path via said secondary path.

2. The method of claim 1 wherein said step of blocking further comprises the step of sending a signal to a network node which merges data from said plurality of primary data paths onto said secondary data path.

3. The method of claim 1 wherein said step of blocking is performed automatically by a network node which merges data from said plurality of primary data paths onto said secondary path upon detection of receipt of a signal from said one primary path.

4. The method of claim 1 wherein said step of sending data from said one primary path via said secondary path further comprises the step of:

sending a data guard band preceding said data.

5. A method for operating a data network comprising a plurality of primary data paths sharing a secondary data path, said method comprising the steps of:

upon detecting a need for use of said secondary path, sending data from one of said primary paths via said secondary path; and blocking data from the other primary paths from entering said secondary path after said sending data from said one primary path via said secondary path;

wherein said step of sending data from said one primary path via said secondary path further comprises the step of sending a data guard band preceding said data, and further wherein a length of said data guard band is based on the time required to accomplish said blocking step.

6. A method for operating a data network comprising a plurality of data sources sharing a data path, said method comprising the steps of:
- upon detecting a need for use of said shared data path by one of said data sources, sending data from said one data source via said shared data path; and
- blocking data from the other data sources from entering said shared data path after said sending data from said one data source via said shared data path;
- wherein said blocking is responsive to any sending of data from said one data source via said shared data path.

7. The method of claim 6 wherein said data sources transmit bursty data traffic and utilize said shared data path as a primary data path.

8. The method of claim 6 wherein said data sources utilize said shared data path as a backup data path.

9. The method of claim 6 wherein said step of blocking further comprises the step of sending a signal to a network node which merges data from said plurality of data sources onto said shared path.

10. The method of claim 6 wherein said step of blocking is performed automatically by a network node which merges data from said plurality of data sources onto said shared path upon detection of receipt of a signal from said one data source.

11. The method of claim 6 wherein said step of sending data from said one data source via said shared data path further comprises the step of:
- sending a data guard band preceding said data.

12. A method for operating a data network comprising a plurality of data sources sharing a data path, said method comprising the steps of:
- upon detecting a need for use of said shared data path by one of said data sources, sending data from said one data source via said shared data path; and
- blocking data from the other data sources from entering said shared data path after said sending data from said one data source via said shared data path;
- wherein said step of sending data from said one data source via said shared data path further comprises the step of sending a data guard band preceding said data, and further wherein a length of said data guard band is based on the time required to accomplish said blocking step.

13. A data network comprising:
- a plurality of primary data paths;
- a secondary data path shared by said plurality of primary data paths;
- a merge node comprising a plurality of input ports for accepting data from said plurality of primary data paths, and an output port for sending data to said secondary data path;
- said merge node configured such that, responsive to receipt of any data from one of said primary data paths on one of said input ports, said merge node blocks all input ports other than said one of said input ports.

14. A data network comprising:
- a plurality of data sources;
- a shared data path shared by said plurality of data sources;
- a merge node comprising a plurality of input ports for accepting data from said plurality of data sources and an output port for sending data to said shared data path;
- said merge node configured such that, responsive to receipt of any data from one of said data sources on one of said input ports, said merge node blocks all input ports other than said one of said input ports.

15. A data network comprising:
- a plurality of primary data paths;
- a secondary data path shared by said plurality of primary data paths;
- a merge node comprising a plurality of input ports for accepting data from said plurality of primary data paths, and an output port for sending data to said secondary data path;
- said merge node configured such that, responsive to receipt of data from one of said primary data paths on one of said input ports, said merge node blocks all input ports other than said one of said input ports;
- wherein said merge node is configured such that, responsive to blocking of data, said output node sends a data guard preceding said data sent to said secondary data path.

16. A data network comprising:
- a plurality of data sources;
- a shared data path shared by said plurality of data sources;
- a merge node comprising a plurality of input ports for accepting data from said plurality of data sources and an output port for sending data to said shared data path;
- said merge node configured such that, responsive to receipt of data from one of said data sources on one of said input ports, said merge node blocks all input ports other than said one of said input ports;
- wherein said merge node is configured such that, responsive to blocking of data, said output node sends a data guard preceding said data sent to said secondary data path, and further wherein a length of said data guard band is based on the time required to accomplish said blocking.

17. The data network of claim 14 wherein said data sources transmit bursty data traffic and utilize said shared data path as a primary data path.

18. The data network of claim 14 wherein said data sources utilize said shared data path as a backup data path.

19. The data network of claim 14 wherein said merge node is configured such that, responsive to blocking of data, said output node sends a data guard preceding said data sent to said shared data path.

20. The data network of claim 19 wherein a length of said data guard band is based on the time required to accomplish said blocking.

* * * * *

UNITED STATES PATENT AND TRADEMARK OFFICE
CERTIFICATE OF CORRECTION

PATENT NO. : 7,660,235 B2  Page 1 of 1
APPLICATION NO. : 10/392574
DATED : February 9, 2010
INVENTOR(S) : Alicherry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1781 days.

Signed and Sealed this

Twenty-eighth Day of December, 2010

David J. Kappos
*Director of the United States Patent and Trademark Office*